United States Patent [19]
Peterson, II

[11] 4,123,070
[45] Oct. 31, 1978

[54] HIGH PRESSURE HIGH TEMPERATURE LIGHT GAS DRIVE SHAFT SEAL

[76] Inventor: William D. Peterson, II, 1996 E. 4675 South, Salt Lake City, Utah 84117

[21] Appl. No.: 729,695

[22] Filed: Oct. 5, 1976

[51] Int. Cl.² .................................................. F16J 15/40
[52] U.S. Cl. ...................................... 277/135; 277/173
[58] Field of Search ................. 277/135, 22, 3, 74, 277/173, 177, 205

[56] References Cited
U.S. PATENT DOCUMENTS

| | | | |
|---|---|---|---|
| 728,124 | 5/1903 | Mitchell | 277/135 |
| 2,705,177 | 3/1955 | Waring | 277/177 |
| 2,968,501 | 1/1961 | Tisch | 277/177 |
| 3,176,996 | 4/1965 | Barnett | 277/3 |
| 3,467,396 | 9/1969 | Hershey | 277/74 |
| 3,697,088 | 10/1972 | Hummer | 277/74 |
| 3,910,428 | 10/1975 | Peterson | 277/135 |
| 4,000,930 | 1/1977 | Poucet et al. | 277/135 |

Primary Examiner—Richard E. Aegerter
Assistant Examiner—L. Footland

[57] ABSTRACT

A drive shaft seal system, having an interior solid material feeder atmosphere being sealed from the outside ambient atmosphere by a sealing system of high pressure hydrogen over liquid via a low pressure seal, the high pressure liquid over the ambient atmosphere via a high pressure seal the liquid being cooled as required.

2 Claims, 4 Drawing Figures

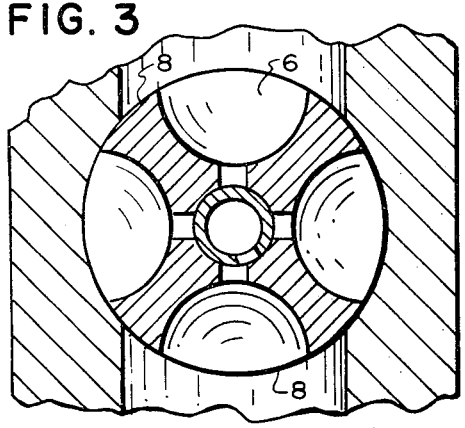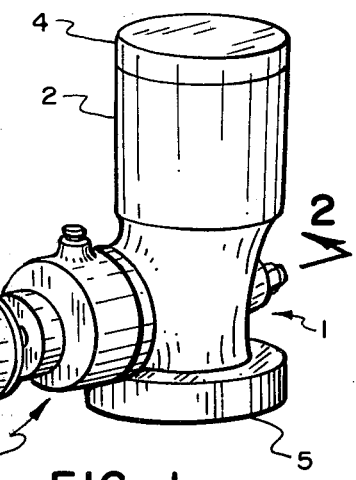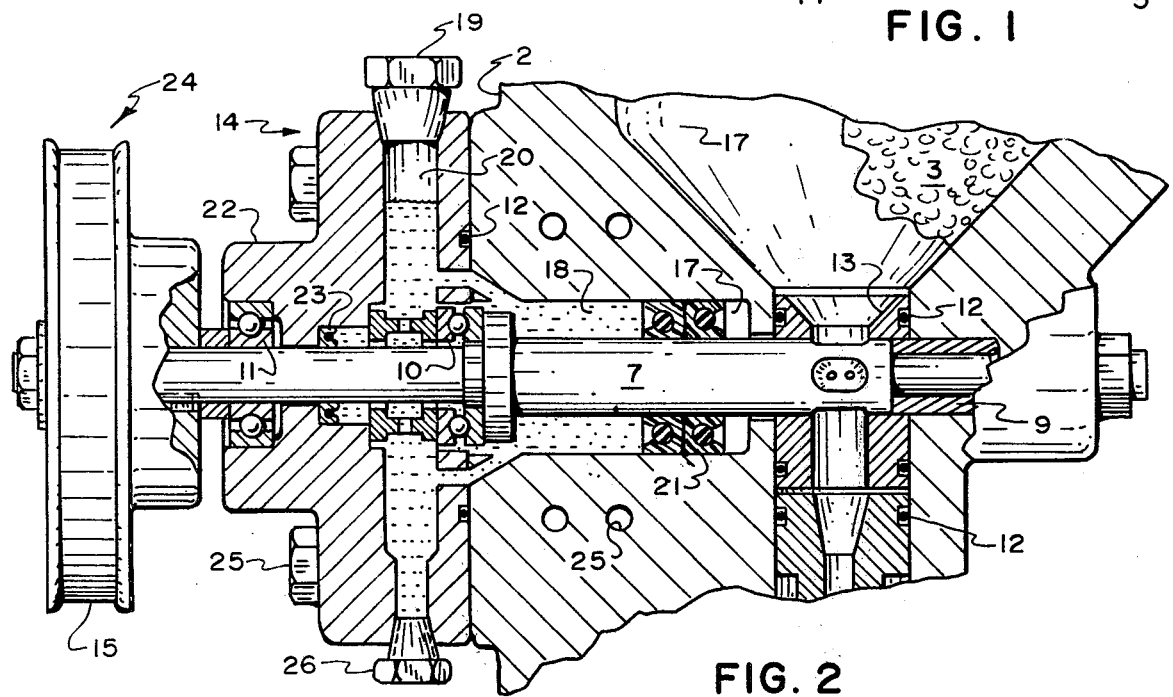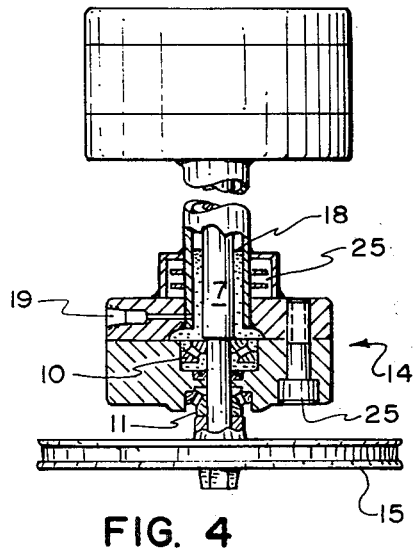

HIGH PRESSURE HIGH TEMPERATURE LIGHT GAS DRIVE SHAFT SEAL

BRIEF SUMMARY OF THE INVENTION

A method of converting coal to petroleum oil consists of feeding a granulated coal mixed with hydrogen through a tubular reactor in the presence of a catalist, the pressure of the reactor being approximately 3,000 psi and the temperature being approximately 1200° F., the hydrogen molecules combining with the coal molecules to form a petroleum type molecule.

To have optimum reaction results, the granulated coal must have regulated feeding and optimum mixing with the hydrogen; also, and even feeding rate is required to avoid plugging the tubular reactor. To feed the coal a rotating star type feeder receives small bucket loads of granulated coal from a hopper and transmits this material to a reactor via a tube type channel. To rotate the star requires a unique seal for the drive shaft since the atmosphere is high pressure hydrogen which may be hot. Since high pressure hydrogen is difficult to seal in and hydraulic fluid is more easily sealable, the feeder drive shaft is sealed from the ambient atmosphere by a sealing system of the high pressure hydrogen being sealed in by high pressure hydraulic fluid at the same high pressure via a low pressure seal, the high pressure hydraulic fluid being sealed in from the ambient atmosphere via a high pressure seal, the hydraulic fluid being cooled as required by a thermal heat exchange through a cooling jacket to protect the high pressure seal from over heating and to prevent the liquid from vaporizing.

BRIEF DESCRIPTION OF THE SEVERAL VIEWS OF THE DRAWING

FIG. 1 is a pictorial view of the coal hopper and feeder system vessel showing the rotating star feeder drive shaft pulley being driven by a motor.

FIG. 2 is a cross section view through the fluid pressurized vessel showing the rotating star feeder below the hopper and the drive shaft on the left with its sealing means, the sealing means shown comprising an inner seal element and an outer seal element, both encircling the drive shaft within a housing formed in the wall of the vessel, with liquid interposed between the seals.

FIG. 3 is a cross sectional view of the star feeder showing the buckets as they surround a purge tube.

FIG. 4 is a cross sectional view of a drive system with the drive shaft being vertical and having the drive pulley being down. Such a configuration might be used for transmitting power in a light gas recycle pump.

DETAILED DESCRIPTION

The coal hopper feeder assembly 1 has a hopper 2 to contain granulated coal 3 which is put into the hopper 2 through the lid 4. A reactor being fed by the feeder 1 will attach to the feeder 1 at the flange 5. Coal 3 is collected in buckets 6. The buckets 6 are an integral part of a rotating drive shaft 7. As this cylindrical rotating drive shaft 7 rotates the integral buckets 6 revolve from the coal 3 hopper side to the dump or discharge position 8. The rotating drive shaft 7 is supported by an end bearing 9, a thrust bearing 10, and a drive bearing 11. O-ring seals 12 seal the hopper 2 housing to the housing 13 and drive assembly 14. The rotating drive shaft 7 has a pulley 15 on its end which is turned at various speeds by a motor 16, the motor 16, or shaft 7 rotating speed thus determining the coal 3 flow rate through the feeder 1. High pressure hydrogen 17 being small molecules is difficult to seal in. This hydrogen 17 would be especially hard to seal between the rotating shaft 7 and drive assembly 14. Thus, a liquid 18 is interposed between them, and the liquid 18 is kept from the balance of the interior of the vessel by a means confining the liquid 18. This liquid 18 is put in a hole sealed by a plug 19. When liquid 18 is put in, air voids 20 will probably be present. To maintain a low pressure differential across the gas 17 liquid 18 seals 21 the seals 21 or second seal element is suitably allowed to slide sufficiently without restrictions along the shaft 7 in the hopper 2 body which is an inboard extension of the drive assembly 14 housing 22, thus compressing the air void 20. A suitable seal 21 thus, is one means of confining the liquid. The liquid 18 space adjacent to the suitably slidable seal 21 must be larger than the air void 20 space so that the air void can be fully compressed when the hopper 2 is pressurized with gas 17. In addition, the liquid 18 space should have sufficient extra capacity to compensate for some liquid 18 lossage which might occur through the high pressure seal 23 during extensive use. The liquid 18 is sealed from the outside atmosphere 24 by a high pressure seal 23 which sealing means is between the drive shaft 7 and the drive assembly 14 housing 22 which the shaft 7 passes through. The drive assembly 14 is attached to the hopper 2 body by bolts 25. A drain plug 26 is provided to remove the liquid 18. Note that no gas 17 liquid 18 seal 21 is required if the shaft 7 is vertical with the drive pulley 15 down, hence, gravity is a means confining the liquid 18, and thus the gas 17 to liquid interface being direct. In some instances the gas 17 may be hot. This heat may occur as gas is heated in the reactor below and then rises. Should the gas 17 be very hot, heating of rotating shaft seals 21 and 23 and the liquid 18 might occur causing seals 21 and 23 failure along with liquid 18 vaporizing. To prevent this from occuring, a heat sink 25 is provided in the hopper 2 body. Such a heat sink 25 might be a cooling jacket with circulating water.

I claim:

1. In a structure including a closed vessel pressured by confined gas therein, a shaft extending through a bore in the wall thereof, a bearing inside said vessel and a bearing outside said vessel journalling said shaft for rotation in said bore, an improved seal for said shaft comprising a pair of spaced apart shaft seals including an inner seal and an outer seal between said spaced apart bearings and encircling said shaft in said bore, said inner seal having one side exposed to pressured gas in said vessel, and comprising two oppositely axially opening U-shaped seal elements liquid filling said bore between said seals; and said inner seal exposed to said pressured gas from the interior of said vessel being axially slidable in an extended cylindrical bore recess on said shaft whereby to cause pressure on said liquid equal to the pressure of gas inside said closed vessel.

2. A structure according to claim 1 with the addition of means for adding and withdrawing liquid from said bore.

* * * * *